Dec. 27, 1966    P. W. RAMSEY    3,294,954
WELDING METHOD AND APPARATUS
Filed Oct. 15, 1963
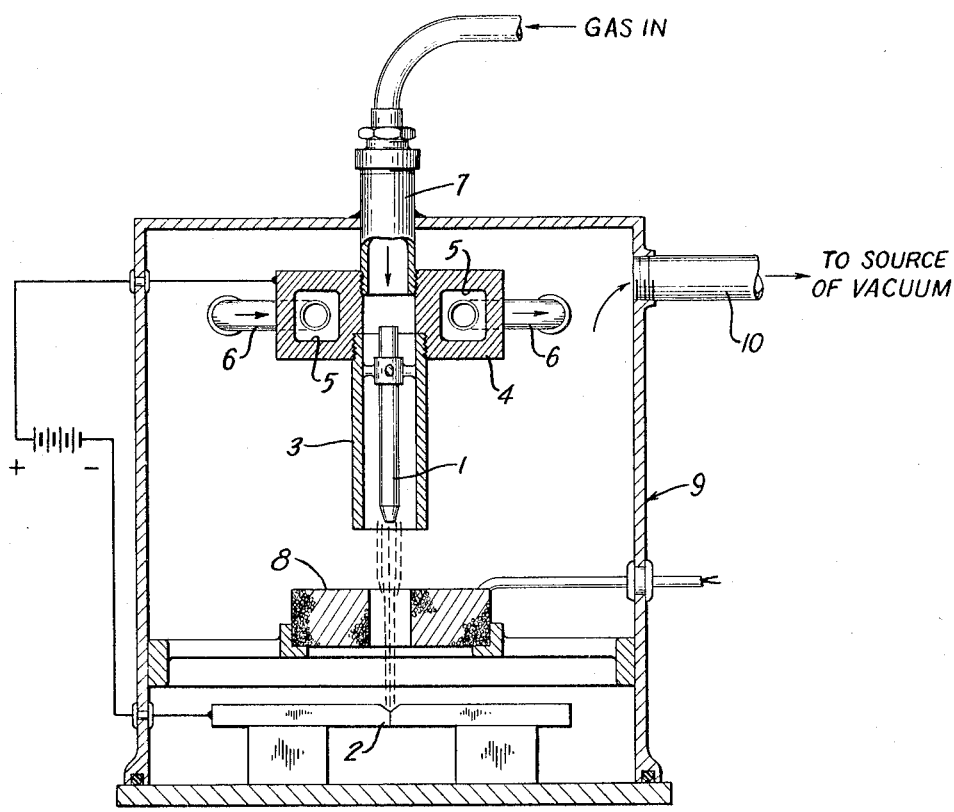
INVENTOR.
PAUL W. RAMSEY
BY
Andrus & Starke
ATTORNEYS United States Patent Office 3,294,954
Patented Dec. 27, 1966

3,294,954
WELDING METHOD AND APPARATUS
Paul W. Ramsey, Wauwatosa, Wis., assignor, by mesne assignments, to Harnischfeger Corporation, Milwaukee, Wis., a corporation of Wisconsin
Filed Oct. 15, 1963, Ser. No. 316,280
4 Claims. (Cl. 219—123)

This invention relates to a method of and apparatus for welding, and more particularly to a method of and apparatus for welding using a beam of charged particles.

It is an object of the invention to provide an improved method of apparatus for welding utilizing a stream of ions which eliminates contamination of the weld and results in sound, clean welds.

According to the invention, a high-temperature metal, such as tungsten, is made the anode and the workpiece is made the cathode in the electrical circuit. An inert gas, such as argon, is supplied to the area of the anode and an arc is established between the anode and cathode which generates a stream of positively charged argon particles which are directed toward the workpiece. The stream of ions is concentrated by an electromagnetic coil which is positioned between the anode and the workpiece.

The electromagnetic coil serves to concentrate and intensify the ion beam so that the beam bombards and melts the workpiece.

The welding process is preferably carried on under vacuum conditions with a presure less than 10 millimeters of mercury and usually with a pressure in the range of 0.1 micron to 1000 microns of mercury.

The welding process and apparatus of the invention can be utilized with various types of metals, such as carbon steel, alloy steel, copper, aluminum, and the like. In addition, the welding process can be used for all types of arc fusion welding, such as seam welding, butt welding, spot welding and the like.

Other objects and advantages will appear in the course of the following description.

The drawing illustrates the best mode contemplated of carrying out the invention.

The drawing is a schematic representation showing the apparatus for carrying out the invention.

As shown in the drawing, an electrode formed of a high-temperature metal, such as tungsten, is made the anode in a D.C. circuit and is located in spaced relation from the workpiece 2, which is the cathode. The electrode 1 is located within an outer tubular member 3 which is supported from a block 4. The block 4 is provided with a series of passages 5 which are adapted to conduct a cooling liquid, such as water. Water is supplied to the passages 5 through conduits 6.

While the electrode 1 is shown as a solid rod surrounded by tubular member 3, the electrode itself can be a hollow member in which case the tube 3 can be eliminated.

A gas conduit 7 is connected in the upper end of an opening in block 4 and is adapted to be connected to a source of an inert gas, such as argon, helium or the like. Argon, or other inert gas entering through gas conduits 7, passes into the tubular member 3 surrounding the electrode 1, and a stream of positively charged argon ions is generated, which is directed toward the workpiece 2. Generally, the accelerating potential required to generate the stream of ions is under 100 volts and generally in the range of 15 to 50 volts.

In order to concentrate the stream of ions passing from the electrode 1 to the workpiece 2, an electromagnetic coil 8 is positioned between the electrode and the workpiece. The stream of ions passes through the central opening in the coil 8 and the field of the coil repulses the stream of positively charged argon ions, reducing the cross section of the ion beam with the result that the energy density striking the workpiece will be considerably higher and of sufficient density to melt the workpiece.

The coil 8, to be used to concentrate the beam, can be any conventional electromagnetic coil, such as a toroidal coil, or a series of circumferentially spaced pole pieces, each of which is surrounded by an electromagnetic coil.

In order to prevent dissipation of the ion beam energy, it is important to operate under vacuum conditions generally under 10 mm. of mercury. To provide the vacuum conditions, the anode and workpiece 2 are enclosed in a vacuum chamber 9 which is provided with an outlet conduit 10 connected to a suitable vacuum source. The water cooling conduits 6 and gas conduit 7 extend in sealed relationship through suitable openings in the wall of the vacuum chamber 9. When the positively charged articles strike the workpiece 2, molecular argon is formed and the argon gas is then withdrawn from the vacuum chamber through the outlet 10. Generally, the flow of argon through the conduit 7 is at a slow rate with a flow rate of 5 to 10 cc. per minute being satisfactory. This flow rate is based on the argon at atmospheric pressure and not on the pressure within the chamber 9.

It is preferred to employ a pressure in the range of 0.1 to 1000 microns of mercury in the chamber 9. This extreme vacuum substantially eliminates air within the chamber and results in welds of extreme cleanliness. Moreover, the argon particles which recombine into argon gas in the area of the workpiece 2, also serve to sheld the weld from any air in the chamber and protect the weld.

In operation of the process, a vacuum is initially drawn within the chamber 9, and the inert gas is introduced to the electrode 1 through the gas conduit 7. An arc is then established between the electrode 1 and workpiece by either touching the electrode to the workpiece and retracting the electrode, using a pilot arc, or any other desired means. A stream of positively charged argon ions is generated at the electrode and travels toward the workpiece 2 through the opening in the electromagnetic coil 8. The coil serves to concentrate the beam of ions into a beam of lesser cross sectional area and thereby intensifies the energy density of the beam striking the workpiece 2 to melt the workpiece and provide the weld.

The welding process of the invention can be used on any metals, such as carbon steel, alloy steel, stainless steel, copper-base alloys, aluminum-base alloys and the like. In addition, the process can be used for seam welding, spot welding, plug welding or the like. A filler metal can also be employed, if desired.

The welding process of the invention has particular application in situations where extreme cleanliness in welding is required, as in the production of components of nuclear reactors and the like. In addition, the welding process has also application for low pressure conditions, such as those encountered in extra terrestrial conditions.

Oxygen-free high conductivity copper plate having a thickness of ¼ inch was placed in a vacuum chamber and spaced below a ¼ inch tungsten tube electrode having a ⅛ inch inside diameter. The electrode was connected to the positive terminal of a source of D.C. power, and the workpiece was connected to the negative terminal. The tubular tungsten electrode was connected to a source of argon gas and gas was supplied to the electrode at a rate of 5 to 10 cc. per minute based on the argon at atmospheric pressure.

An arc was struck between the electrode and the workpiece by touching the electrode to the workpiece and retracting it. A stream of argon ions thus was generated at the electrode and directed through the center of a toroidal electromagnetic focusing coil. The beam of ions was concentrated by the coil and struck the copper plate with sufficient intensity to fuse the plate. The welding was carried on with a current of 54 amperes and a voltage of 32 volts.

Various modes of carrying out the invention are contemplated as being within the scope of the following claims particularly pointing out and distinctly claiming the subject matter which is regarded as the invention.

I claim:
1. An apparatus for welding a workpiece, comprising an electrode spaced a substantial distance from a workpiece, means for supplying an inert gas to the electrode, means for making the electrode the anode in an electrical circuit, means for making the workpiece the cathode in said electrical circuit, means for establishing an arc between the electrode and the workpiece to generate a stream of positively charged ions at the anode with said stream travelling toward the workpiece, means for drawing a vacuum of between .1 and 10 mm. of mercury on said stream of ions and electromagnetic means located between the electrode and the workpiece for concentrating the stream of ions to reduce the cross section of the stream and permit said stream to traverse said substantial distance and to increase the energy density of the stream striking the workpiece.

2. An apparatus for welding a workpiece, comprising a closed chamber, a rod-like electrode located within the chamber, a tubular member spaced outwardly of the electrode to provide an annular gas passage therebetween, conduit means extending through the wall of said chamber for supplying an inert gas to said passage, means for making the electrode the anode in an electrical circuit, means for making a workpiece disposed within said chamber the cathode in said electrical circuit, an electromagnetic coil disposed in said chamber and located between said electrode and the workpiece, and means for establishing an arc between the electrode and the workpiece to generate a stream of positively charged ions at said electrode, said stream of ions passing through said coil and being concentrated to thereby increase the energy density of the stream striking the workpiece and means for drawing a vacuum between .1 and 10 mm. of mercury on said closed chamber.

3. A method of welding, comprising the steps of connecting an anode and a cathode in an electric circuit, supplying an inert gas to the area of the anode, establishing an arc between the anode and cathode to generate a stream of positively charged ions while maintaining the anode at a substantial distance from said cathode, directing the stream of ions toward a workpiece to be welded, concentrating the stream of ions into a stream of smaller cross sectional area to thereby increase the energy density of the beam striking the workpiece to a value sufficient to melt the workpiece, and maintaining a pressure of greater than .1 mm. but less than 10 mm. of mercury on said anode and cathode.

4. A method of welding, comprising making an electrode an anode in an electrical circuit, making a workpiece to be welded the cathode in the electrical circuit, enclosing the anode and cathode in a hermetically sealed container, reducing the pressure in the container to a value less than 10 mm. of mercury, establishing an arc between the anode and the cathode, supplying an inert gas selected from the group consisting of argon and helium to the anode to thereby generate a stream of positively charged ions which travel from the anode to the cathode, and passing the stream through an electromagnetic field to thereby concentrate the cross sectional area of the beam to a sufficient energy density to fuse the workpiece.

References Cited by the Examiner
UNITED STATES PATENTS

| | | |
|---|---|---|
| 2,345,080 | 3/1944 | Van Ardenne. |
| 2,806,124 | 9/1957 | Gage _____ 219—121 |
| 2,899,556 | 8/1959 | Schopper et al. |
| 2,944,140 | 7/1960 | Giannini et al. _____ 219—213 |
| 3,029,635 | 4/1962 | Fetz _____ 219—121 |
| 3,083,289 | 3/1963 | Munro et al. _____ 219—75 |
| 3,143,680 | 8/1964 | Klein et al. |
| 3,210,454 | 10/1965 | Morley _____ 219—121 X |
| 3,218,431 | 11/1965 | Stauffer _____ 219—121 |

JOSEPH V. TRUHE, *Primary Examiner.*